United States Patent
Mitchell et al.

(10) Patent No.: US 6,312,626 B1
(45) Date of Patent: Nov. 6, 2001

(54) INVISCID MELT SPINNING OF MULLITE FIBERS

(76) Inventors: Brian S. Mitchell, 300 Boggs Bldg., Tulane University, New Orleans, LA (US) 70118; Zhijun Xiao, c/o Schlumberger Asia Solution Center (SASC) 18th & 19th Floor, East Wing, Rohas Perkasa No. 8, Jalan Perak, 50450, Kuala Lumpur (MY); Haoyue Zhang, 1309 Carrollton Ave., Apt. 105, Metairie, LA (US) 70005

( * ) Notice: Subject to any disclaimer, the term of this patent is extended or adjusted under 35 U.S.C. 154(b) by 0 days.

(21) Appl. No.: 09/580,903

(22) Filed: May 30, 2000

Related U.S. Application Data
(60) Provisional application No. 60/136,473, filed on May 28, 1999.

(51) Int. Cl.[7] .............................. B29B 9/00; C04B 35/653
(52) U.S. Cl. ................................. 264/5; 264/13; 264/332
(58) Field of Search .................................. 264/5, 13, 332

(56) References Cited

U.S. PATENT DOCUMENTS

| | | | |
|---|---|---|---|
| 4,240,833 | * 12/1980 | Myles | 106/39.6 |
| 4,664,704 | * 5/1987 | Dohnomoto et al. | 75/229 |
| 6,004,890 | * 12/1999 | Ueda et al. | 442/136 |

* cited by examiner

*Primary Examiner*—Christopher A. Fiorilla
(74) *Attorney, Agent, or Firm*—Garvey, Smith, Nehrbass & Doody, L.L.C.

(57) ABSTRACT

A method of producing mullite fibers by inviscid melt spinning includes providing mullite and excess silicate, melting the mullite at a temperature of 1800–2500° C., and extruding the mullite through an orifice. Apparatus for carrying out the method preferably includes a boron nitride (BN) crucible and an argon atmosphere, with a melt temperature of around 2000° C., and a spinning pressure of around 276 kPa (40 psi).

9 Claims, 3 Drawing Sheets

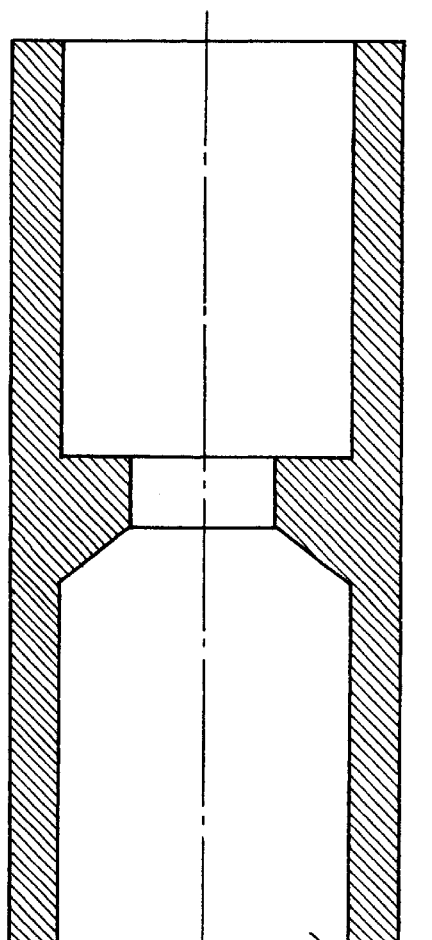
F I G. 5A
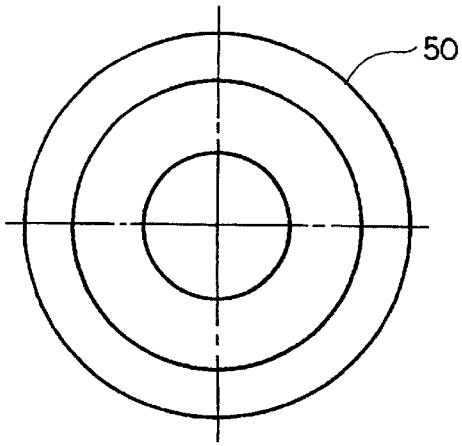
F I G. 5B
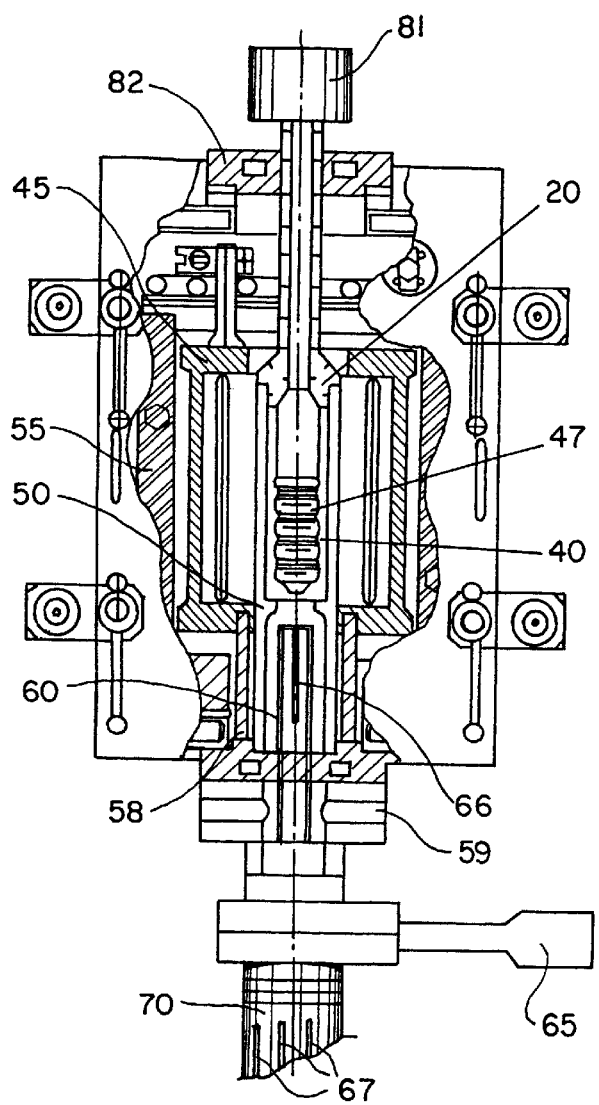
F I G. 6

INVISCID MELT SPINNING OF MULLITE FIBERS

CROSS-REFERENCE TO RELATED APPLICATIONS

Priority of U.S. Provisional Patent Application Serial No. 60/136,473, filed May 28, 1999, incorporated herein by reference, is hereby claimed.

STATEMENT REGARDING FEDERALLY SPONSORED RESEARCH OR DEVELOPMENT

The invention disclosed herein was made during the performance of work under Contract No. DOD/LEQSF (1996–99)-07. The Federal Government may have rights in this invention.

REFERENCE TO A "MICROFICHE APPENDIX"

Not applicable

BACKGROUND OF THE INVENTION

1. Field of the Invention

The present invention relates to mullite fibers. More particularly, the present invention relates to apparatus for and a method of producing mullite fibers by inviscid melt spinning.

2. General Background of the Invention

The aluminosilicate ($SiO_2$—$Al_2O_3$) system is one of the most widely studied binary metal oxide systems, due to the many structural and refractory ceramics that contain a majority of these two Compounds. Of the aluminosilicates, mullite ($Al_2[Al_{2+2x}Si_{2-2x}]O_{10-x}$ where $0.25<x<0.4$, representing, 69–85% $Al_2O_3$ by weight, hereinafter referred to as "mullite") possesses excellent high temperature mechanical properties such as creep resistance. The potential advantages of mullite as a high temperature structural material have not yet been fully realized, however, due in part to the inherent difficulty in processing mullite into a fiber form for Uses Such as reinforcement in composites.

There are two existing processes for the manufacturing, of fibers in the $SiO_2$—$Al_2O_3$, system: melt-spinning processes and slurry or solution processes. Melt-spinning methods are usually used for fibers containing 45–60 wt % $Al_2O_3$. Higher alumina content fibers cannot be formed by these methods because of the higher melting point and lower viscosity. Two other methods developed for high-$Al_2O_3$ fibers have advanced to commercial production, namely, the slurry and solution- or sol-gel-spinning processes. The slurry processes involve extruding aluminosilicate slurries, then drying and heating the resulting fibers to produce a polycrystalline filament. The solution or sol-gel processes involve extruding and drawing into fibers a viscous solution of aluminum compounds, followed by drying and heating at high temperature. However, multiple process steps make slurry and solution processes slow, uneconomical and difficult to control. Additionally, the difficulty in controlling the fiber geometry and impurities and heterogeneous microstructures in the final products leading to their poor mechanical properties are also drawbacks of the slurry and solution methods. Other methods, such as the Edge-defined Film Growth (EFG) technique and the Unidirectional Freezing of a Hydrogel (UFH) technique, might also be used for the high-$Al_2O_3$ fiber production, but their low process productivity and expensive equipment costs make them difficult to commercialize.

Inviscid Melt Spinning (IMS) has been used to produce fibers of a wide variety of materials ranging from metals such as steel, to ceramics such as barium titanate. The IMS process utilizes a reactive gas environment to stabilize low viscosity melts, typically metals, alloys or metal oxides, against Rayleigh breakup. The type of reactant gas varies, depending on the melt chemistry, as do the processing parameters (melt temperature, extrusion pressure, crucible material), and the process must be carefully modified for each type of fiber chemistry.

This invention includes among its objectives apparatus for producing mullite fibers utilizing a reactive gas stabilization process.

Another objective of this invention involves a crucible design which eliminates volatilization of one of the key melt components, specifically $SiO_2$, at processing temperatures, thereby maintaining appropriate melt composition during the fiber forming process.

The following U.S. Patents are incorporated herein by reference: U.S. Patent Nos.

| | | | |
|---|---|---|---|
| 4,101,615 | 3,626,041 | 5,055,348 | 5,582,912 |
| 3,668,096 | 3,593,775 | 4,104,355 | 3,727,292; | and

Inviscid Melt Spinning Patents:
Cunningham, R. E., et al., U.S. Pat. No. 3,720,741, Mar. 13, 1973;
Dobo, E. J., U.S. Pat. No. 3,771,982, Nov. 13, 1973;
Dobo, E. J., U.S. Pat. No. 3,788,786, Jan. 29, 1974;
Dobo, E. J., U.S. Pat. No. 3,811,850, May 21, 1974;
Dobo, E. J., U.S. Pat. No. 3,904,381, Sep. 9, 1975;
Dunn, S. A., et al., U.S. Pat. No. 3,516,478, Jun. 23, 1970;
Dunn, S. A., et al., U.S. Pat. No. 3,658,979, Apr. 25, 1972;
English, J. J., U.S. Pat. No. 3,926,248, Dec. 16, 1975;
Garrett, L. C., ct al., U.S. Pat. No. 3,583,027, Jun. 8, 1971;
Hanison, D. P., et al., U.S. Pat. No. 3,614,808, Oct. 26, 1971;
Huang, J., U.S. Pat. No. 5,702,498, Dec. 30, 1997;
Junker, B. T., U.S. Pat. No. 3,853,171, Dec. 10, 1974;
Junker, B. T., U.S. Pat. No. 3,854,518, Dec. 17, 1974;
Junker, B. T., U.S. Pat. No. 3,854,519, Dec. 17, 1974;
Mottern, J. W., et al., U.S. Pat. No. 3,613,158, Oct. 19, 1971;
Ostot, R. S., et al., U.S. Pat. No. 3,645,657, Feb. 29, 1972;
Privott, W. J. Jr., et al., U.S. Pat. No. 3,593,775, Jul. 20, 1971;
Piivott, W. J. Jr., et al., U.S. Pat. No. 3,692,089, Sep. 19, 1972;
Piivott, W. J. Jr., et al., U.S. Pat. No. 3,715,418, Feb. 6, 1973;
Privott, W. J. Jr., et al., U.S. Pat. No. 3,715,419, Feb. 6, 1973;
Privott, W. J. Jr., et al., U.S. Pat. No. 3,780,153, Dec. 18, 1973;
Rakestraw, L. F., U.S. Pat. No. 3,584,678, Jun. 15, 1971;
Rakestraw, L. F., U.S. Pat. No. 3,750,741, Aug. 7, 1973;
Rakestraw, L. F., U.S. Pat. No. 3,884,289, May 20, 1975;
Rakestraw, L. F., U.S. Pat. No. 3,889,739, Jun. 17, 1975; and
Rakestraw, L. F., U.S. Pat. No. 3,946,794, Mar. 30, 1976.

BRIEF SUMMARY OF THE INVENTION

The present invention includes apparatus for and a method of producing mullite fibers by inviscid melt spinning The present invention includes a method of producing mullite fibers by inviscid melt spinning comprising:
providing mullite in the composition range 69–85% Al2O3 by weight;
providing excess silicate;

melting the mullite at a temperature between 1800 and 2500° C. to produce molten mullite;

extruding the molten mullite through an orifice; and stabilizing the molten mullite stream in propane. The present invention also includes apparatus for performing the method. The temperature is preferably 1850–2250° C., and even more preferably 1950–2050° C. There is preferably a spinning pressure of about 50–500 kPa, more preferably 100–400 kPa, and most preferably 200–300 kPa.

The invention also includes apparatus for producing mullite fibers by inviscid melt spinning comprising;

a boron nitride crucible for containing mullite;

an argon atmosphere;

heating means for heating the mullite to a temperature between 1800 and 2500° C.;

means for providing a spinning pressure of about 50–500 kPa (7–75 psi);

a crucible for containing excess silicate; and propane for stabilizing the molten mullite. The temperature is preferably 1850–2250° C., and even more preferably 1950–2050° C. The spinning pressure is preferably 100–400 kPa, and more preferably 200–300 kPa.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5A is a cross-sectional view of the protection tube of the preferred embodiment of the apparatus of the present invention;

FIG. 5B is a top view of the protection tube of the preferred embodiment of the apparatus of the present invention; and FIG. 6 is a cutaway view of a preferred embodiment of the apparatus of the present invention.

DETAILED DESCRIPTION OF THE INVENTION

Figure 4A:
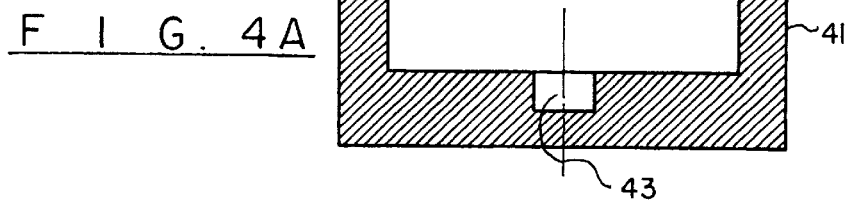
FIG. 4A is a cross-sectional view of the melting crucible of the preferred embodiment of the apparatus of the present invention.
Figure 4B:
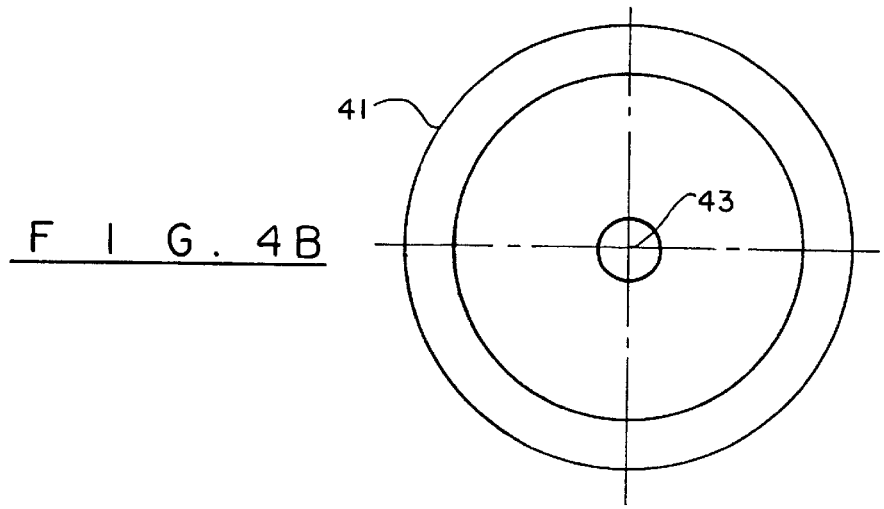
FIG. 4B is a top view of the melting crucible of the preferred embodiment of the apparatus of the present invention.

The inventors believe that they are the first to use inviscid melt spinning to produce mullite fibers. To do so, they preferably use a boron nitride (BN) crucible 40, an inert gas atmosphere, a melt temperature of 1800–2500° C., and a differential spinning pressure of around 50–500 kPa (7–75 psid). Mullite powder, ranging in composition from 69.0 to 84.3 wt % $Al_2O_3$, balance $SiO_2$, is placed in a crucible 40. FIG. 4 illustrates a typical crucible 40, composed of boron nitride (BN), and containing in its base 41 one or more circular orifices 43, typically of diameter 1–1000 micrometers.

The mullite is heated to above its melting point by means of any suitable heating method, preferably graphite resistance heating elements 45. Previous work has shown that mullite decomposes at high temperature and loses $SiO_2$ when it is heat-treated in a reducing atmosphere. Heat-treatment experiments of mullite samples in a helium atmosphere between 1650–1800° C. have shown decreasing amounts of mullite and increasing amounts of alumina with increasing temperature and duration of the experiments. The following reaction was considered:

$$3Al_2O_3 \cdot 2SiO_2(s) \leftrightarrows 3Al_2O_3(s) + 2SiO_2(g) \tag{1}$$

Also, R. E. Wright and H. I. Wolff tested the attack of mullite refractory by carbon formed from the pyrolysis of hydrocarbons in the temperature range 1400–1500° C. Theynoted that the decomposition was caused by the reaction of carbon with silica and silicates to form a volatile, reduced form of silica. The work of Xiao and Mitchell has shown that, in the presence of carbon, such as is found in graphitic resistance heating elements and fixtures, the following decomposition reaction occurs for mullite:

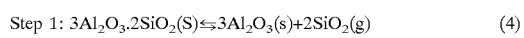

Step 1: $3Al_2O_3 \cdot 2SiO_2(S) \leftrightarrows 3Al_2O_3(s) + 2SiO_2(g)$   (4)

Step 2: $SiO_2(g) + C(s) \leftrightarrows SiO(g) + CO(g)$   (5)

Net: $3Al_2O_3 \cdot 2SiO_2(s) + 2C(s) \leftrightarrows 3Al_2O_3(s) + 2SiO(g) + 2CO(g)$   (6)

In this reaction scheme, mullite first decomposes into $Al_2O_3$ and a molten silicate. With increasing holding time, the $SiO_2$ gas released from the melt reacts with carbon components in the furnace system and forms SiO and CO gases. The formation of CO gas is supported by IR analysis. The SiO species deposit on the "cold" surfaces of the furnace components.

Figure 3A:
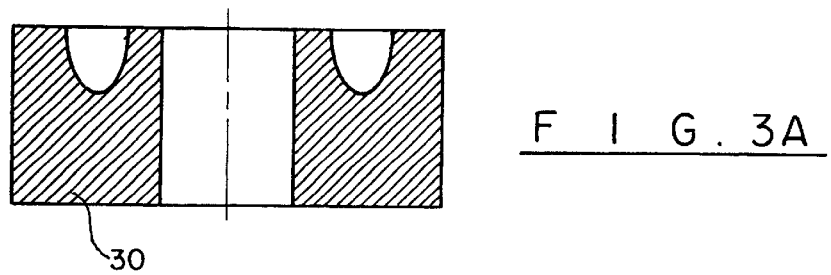
FIG. 3A is a cross-sectional view of the $SiO_2$ crucible of the preferred embodiment of the apparatus of the present invention.
Figure 3B:
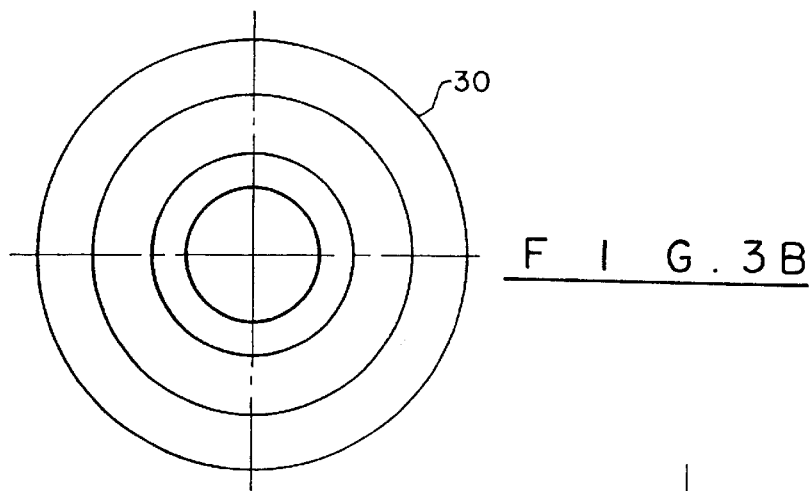
FIG. 3B is a top view of the $SiO_2$ crucible of the preferred embodiment of the apparatus of the present invention.

In a preferred embodiment the apparatus 10 employed in this invention contains, in addition to the primary mullite-containing crucible 40, a silicate crucible 30 (the one in FIGS. 3A and 3B is made of BN) which contains excess silicate 31, preferably $SiO_2$. FIGS. 3A and 3B illustrate the concept. It is the purpose of the silicate crucible 30 is to provide additional silicate, which when volatilized at the spinning temperatures, creates an equilibrium of quantity of SiO and/or $SiO_2$ in the vapor phase, which in turn shifts reactions 4–6 above to the left. In doing so, the $SiO_2$ present in the mullite portion of the crucible is allowed to remain part of the mullite compound, thereby maintaining a constant melt composition during the fiber formation process.

Figure 1:
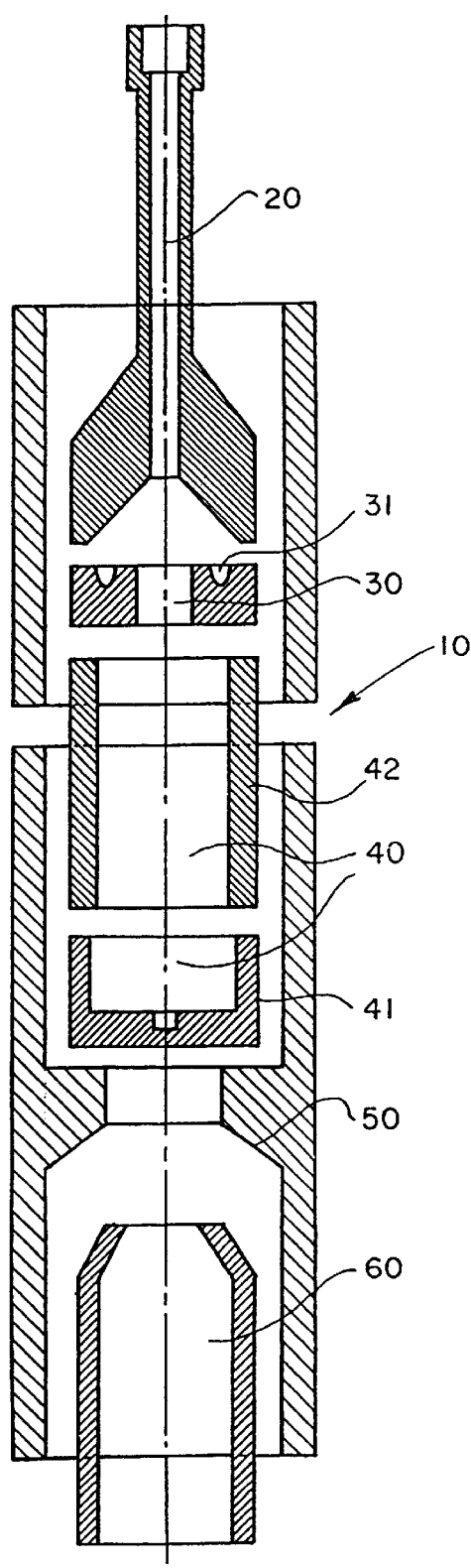
FIG. 1 is a cross-sectional view of the preferred embodiment of the apparatus of the present invention.
Figure 2A:
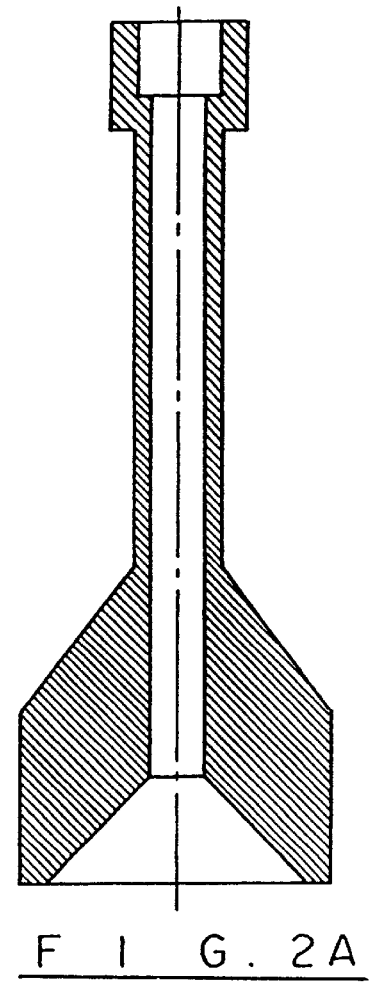
FIG. 2A is a cross-sectional view of the gas fixture of the preferred embodiment of the apparatus of the present invention.
Figure 2B:
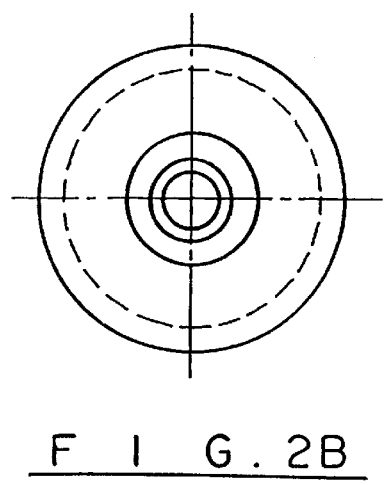
FIG. 2B is a schematic view of the gas fixture of the preferred embodiment of the apparatus of the present invention.

In the fiber formation process, the low viscosity melts are extruded into a reactive atmosphere by applying a pressure difference between the melting crucible 40 and the reaction chamber. A pressure difference of between 50 and 500 kPa, preferably 256 kPa, is applied by means of a tubular graphite fixture 20 (FIG. 2A) held in compression to the top of the crucible assembly. In the reaction chamber, a stabilizing gas, preferably propane, is introduced through the annulus between the gas distributor 60 and protection tube 50 (see FIGS. 5A and 5B for the protection tube 50 and FIG. 1 for the overall assembly). Heat from the molten jet pyrolyzes the stabilizing gas, forming carbon and hydrogen. The carbon deposits on the surface of the molten jet, stabilizing the molten stream against Rayleigh breakup. The mechanisms of reactive jet stabilization have been described by others. The stabilized molten stream then cools and solidifies to form fiber. The spun products are collected at the bottom of the collection chamber 70.

Example 1

Twenty grams of commercial grade fused-mullite powder (melting point 1830° C., density 3.15 g/cm$^3$ and particle size 10–53 μm) of composition 74.9% $Al_2O_3$ and 24.4% $SiO_2$ by weight is placed in a 1.25 cm O.D.×1.0 cm I.D.×1.25 cm deep BN crucible 40. A BN ring 30 containing 0.36 g of excess $SiO_2$, separate from the mullite sample, is inserted above the primary crucible 40. A 2000° C. high temperature furnace with a 180° split design, rigid fibrous graphite shields and a graphite heating element 45 is used to heat the crucible and contents to 2000° at a rate of 80° C./min under an Argon atmosphere.

In the fiber formation process, the low viscosity melt is extruded through a single, 400 μm diameter orifice 43 in the bottom of the primary crucible 40, into a flowing propane atmosphere by applying a pressure difference of 256 kPa between the melting crucible 40 and the reaction chamber. In the reaction chamber propane is introduced through the annulus between the gas distributor 60 and protection tube 50, creating a propane flow rate of 60 ml/min. Heat from the molten mullite jet pyrolyzes the propane, forming carbon and hydrogen. The carbon deposits on the surface of the moltenjet, stabilizing the mullite stream 66 against Rayleigh breakup. The stabilized molten stream then cools and solidifies to form fiber 67. The spun products, including fiber 67 and some shot, are collected at the bottom plate (stainless steel) of the collection chamber 70.

FIG. 6 shows apparatus of the present invention including graphite fixture 20, BN crucible 40 having mullite melt 47 therein, a heating element 45, fiber insulation 55, insulation 58, an adapter 59, a gate valve 65, a water-cooled gas inlet 81, and a water cooled top cover 82.

More information can be found in the papers attached to our U.S. Provisional Patent Application Serial No. 60/136, 473, filed May 28, 1999, all of which are hereby incorporated by reference:

Zhijun Xiao and Brian S. Mitchell, "Optimization of Process Parameters in the Production of Mullite Fibers via Inviscid Melt-Spinning (IMS)"; *Chemical Engineering Communications*, 173, 123–133 (1999);

Zhijun Xiao and Brian S. Mitchell, "The Production of Mullite Fibers via Inviscid Melt-Spinning (IMS)", *Materials Letters*, 37[6], 359–365 (1998);

Zhijun Xiao and Brian S. Mitchell, "Mullite Decomposition Kinetics and Melt Stabilization in the Temperature Range 1900–2000° C.", *Journal of the American Ceramic Society*; 83[4], 761–767, (2000); and Brian S. Mitchell, "Inviscid Melt Spinning of Mullite Fibers", presented orally at The American Ceramic Society's 23$^{rd}$ Annual Cocoa Beach Conference & Exposition, on Jan. 26, 1999.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

We claim:

1. A method of producing mullite fibers by inviscid melt spinning comprising:
   providing mullite in the composition range 69–85% $Al_2O_3$ by weight;
   providing excess silicate;
   melting the mullite at a temperature between 1800 and 2500° C. to produce molten mullite;
   extruding the molten mullite through an orifice as a molten mullite stream; and
   stabilizing the molten mullite stream in propane to produce mullite fibers.

2. The invention of claim 1, wherein the temperature is 1850–2250° C.

3. The invention of claim 2, wherein the method occurs at a spinning pressure of 100–400 kPa.

4. The invention of claim 2, wherein the method occurs at a spinning pressure of 200–300 kPa.

5. The invention of claim 1, wherein the temperature is 1950–2050° C.

6. The invention of claim 5, wherein the method occurs at a spinning pressure of 100–400 kPa.

7. The invention of claim 5, wherein the method occurs at a spinning pressure of 200–300 kPa.

8. The invention of claim 1, wherein the method occurs at a spinning pressure of 100–400 kPa.

9. The invention of claim 1, wherein the method occurs at a spinning pressure of 200–300 kPa.

* * * * *